United States Patent
Spare et al.

(10) Patent No.: US 9,917,340 B2
(45) Date of Patent: Mar. 13, 2018

(54) FUEL CELL SYSTEM TO POWER A PORTABLE COMPUTING DEVICE

(71) Applicant: Apple Inc., Cupertino, CA (US)

(72) Inventors: Bradley L. Spare, Oceanside, CA (US); Vijay M. Iyer, Mountain View, CA (US); Jean L. Lee, San Jose, CA (US); Gregory L. Tice, Los Altos, CA (US); Michael D. Hillman, Los Altos, CA (US); David I. Simon, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 311 days.

(21) Appl. No.: 14/659,537

(22) Filed: Mar. 16, 2015

(65) Prior Publication Data

US 2015/0249280 A1  Sep. 3, 2015

Related U.S. Application Data

(63) Continuation of application No. 12/849,558, filed on Aug. 3, 2010, now Pat. No. 8,980,491.
(Continued)

(51) Int. Cl.
*H01M 8/04* (2016.01)
*H01M 16/00* (2006.01)
(Continued)

(52) U.S. Cl.
CPC ..... *H01M 16/006* (2013.01); *H01M 8/04014* (2013.01); *H01M 8/04201* (2013.01); *H01M 8/04208* (2013.01); *H01M 8/04298* (2013.01); *H01M 8/04559* (2013.01); *H01M 8/04619* (2013.01); *H04B 7/24* (2013.01);
(Continued)

(58) Field of Classification Search
CPC ......... H01M 8/04201; H01M 8/04014; H01M 8/04208; H01M 8/04559; H01M 8/04619; H01M 16/006; H01M 8/04298; H01M 8/0432; H01M 8/0438; H01M 8/04552; H01M 8/04656; H01M 8/04753;
(Continued)

(56) References Cited

U.S. PATENT DOCUMENTS

2007/0020510 A1*  1/2007  Dunn ................ H01M 8/04089
                                                              429/65
2007/0190369 A1   8/2007  Leach
2009/0079382 A1   3/2009  Norimatsu

FOREIGN PATENT DOCUMENTS

CN    201466785 U    5/2010
EP     1306918 A2    5/2003
(Continued)

*Primary Examiner* — Gary Harris
(74) *Attorney, Agent, or Firm* — Blank Rome LLP

(57) ABSTRACT

The disclosed embodiments relate to the design of a portable and cost-effective fuel cell system for a portable computing device. This fuel cell system includes a fuel cell stack which converts fuel into electrical power. It also includes a fuel source for the fuel cell stack and a controller which controls operation of the fuel cell system. The fuel system also includes an interface to the portable computing device, wherein the interface comprises a power link that provides power to the portable computing device, and a bidirectional communication link that provides bidirectional communication between the portable computing device and the controller for the fuel cell system.

20 Claims, 5 Drawing Sheets

Related U.S. Application Data

(60) Provisional application No. 61/355,393, filed on Jun. 16, 2010.

(51) Int. Cl.

| | | |
|---|---|---|
| *H01M 8/04082* | (2016.01) | |
| *H01M 8/04298* | (2016.01) | |
| *H01M 8/04014* | (2016.01) | |
| *H04B 7/24* | (2006.01) | |
| H01M 8/0432 | (2016.01) | |
| H01M 8/0438 | (2016.01) | |
| H01M 8/04537 | (2016.01) | |
| H01M 8/04746 | (2016.01) | |
| H01M 8/04858 | (2016.01) | |
| H01M 8/04828 | (2016.01) | |

(52) U.S. Cl.
CPC ........ *H01M 8/0432* (2013.01); *H01M 8/0438* (2013.01); *H01M 8/0491* (2013.01); *H01M 8/0494* (2013.01); *H01M 8/04552* (2013.01); *H01M 8/04656* (2013.01); *H01M 8/04753* (2013.01); *H01M 8/04768* (2013.01); *H01M 2250/30* (2013.01); *Y02B 90/18* (2013.01); *Y02E 60/50* (2013.01)

(58) Field of Classification Search
CPC ........... H01M 8/04768; H01M 8/0491; H01M 8/0494; H04B 7/24
USPC .............................. 429/9, 428, 430, 432, 439
See application file for complete search history.

(56) References Cited

FOREIGN PATENT DOCUMENTS

| EP | 1455402 A1 | 9/2004 |
|---|---|---|
| EP | 1455403 A2 | 9/2004 |
| EP | 1306918 A3 | 10/2005 |
| EP | 1455403 A3 | 5/2006 |

\* cited by examiner

FUEL CELL SYSTEM TO POWER A PORTABLE COMPUTING DEVICE

RELATED APPLICATION

The instant application is a continuation of, and hereby claims priority to, pending U.S. patent application Ser. No. 12/849,558, which was filed on 3 Aug. 2010, which is titled "Fuel Cell System to Power a Portable Computing Device," by inventors Bradley L. Spare, Vijay M. Iyer, Jean L. Lee, Gregory L. Tice, Michael D. Hillman and David I. Simon. The instant application further claims priority to U.S. provisional patent application No. 61/355,393, which was filed 16 Jun. 2010, which is titled "Portable Hydrogen Fuel Cell System," by inventors Bradley L. Spare, Vijay M. Iyer, Jean L. Lee, Gregory L. Tice, Michael D. Hillman and David I. Simon, to which parent application Ser. No. 12/849,558 also claims priority. Each of these applications is incorporated by reference.

BACKGROUND

Field

The disclosed embodiments generally relate to systems that use fuel cells to provide electrical power. More specifically, the disclosed embodiments relate to a fuel cell system which is designed to provide electrical power to a portable computing device.

Related Art

Our country's continuing reliance on fossil fuels has forced our government to maintain complicated political and military relationships with unstable governments in the Middle East, and has also exposed our coastlines and our citizens to the associated hazards of offshore drilling. These problems have led to an increasing awareness and desire on the part of consumers to promote and use renewable energy sources. For example, the Electronic Product Environmental Assessment Tool (EPEAT) is presently used to produce data that helps consumers evaluate the environmental friendliness of electronic products. Moreover, the EPEAT score for an electronic product can be increased by providing a renewable energy source for the product.

As a consequence of this increased consumer awareness, electronics manufacturers have become very interested in developing renewable energy sources for their products, and they have been exploring a number of promising renewable energy sources such as hydrogen fuel cells. Hydrogen fuel cells have a number of advantages. Such fuel cells and associated fuels can potentially achieve high volumetric and gravimetric energy densities, which can potentially enable continued operation of portable electronic devices for days or even weeks without refueling. However, it is extremely challenging to design hydrogen fuel cell systems which are sufficiently portable and cost-effective to be used with portable electronic devices.

SUMMARY

The disclosed embodiments relate to the design of a portable and cost-effective fuel cell system for a portable computing device. This fuel cell system includes a fuel cell stack which converts fuel into electrical power. It also includes a fuel source for the fuel cell stack and a controller which controls operation of the fuel cell system. The fuel system also includes an interface to the portable computing device, wherein the interface comprises a power link that provides power to the portable computing device, and a bidirectional communication link that provides bidirectional communication between the portable computing device and the controller for the fuel cell system.

In some embodiments, the fuel source is a fuel cartridge which is detachably affixed to the fuel cell system.

In some embodiments, the fuel source comprises sodium borohydride and water.

In some embodiments, the fuel system includes a fan (or fans) configured to produce an air flow (or air flows) that: supply oxygen to the fuel cell system; and provide cooling for the fuel cell system.

In some embodiments, the fuel cell system includes an internal rechargeable battery.

In some embodiments, the fuel cell system includes a first direct-current-to-direct-current (DC/DC) converter, which converts a voltage from the fuel cell stack into a battery voltage for the internal rechargeable battery.

In some embodiments, the fuel cell system includes a second DC-to-DC converter, which converts the battery voltage to a computing-device voltage which is used to power the computing device.

In some embodiments, the bidirectional communication link communicates: fuel cell state information from the fuel cell system to the portable computing device; and fuel cell control information from the portable computing device to the fuel cell system.

In some embodiments, the fuel cell state information specifies one or more of the following: how much power is available from the fuel cell system; a state-of-charge of an internal rechargeable battery within the fuel cell system; a temperature of the fuel cell stack; a pressure at an inlet of the fuel cell stack; a pressure at an outlet of the fuel cell stack; cell voltages for individual cells in the fuel cell stack; how much fuel remains in the fuel source; and certification information for the fuel cell system.

In some embodiments, the fuel cell control information specifies one or more of the following: a request for a specified amount of power from the fuel cell system; a reactant rate in the fuel source; a fuel cell stack current to be pulled off the fuel cell stack; a speed of a fan within the fuel stack system; and a command to run diagnostics for the fuel cell system.

In some embodiments, the fuel cell state information and the fuel cell control information are used in one or more feedback-control loops to actively control one or more operating parameters of the fuel cell system.

In some embodiments, the bidirectional communication link also communicates: computing-device state information from the portable computing device to the fuel cell system; and computing-device control information from the fuel cell system to the portable computing device.

In some embodiments, the computing-device state information specifies one or more of the following: a power requirement for the portable computing device; and a state-of-charge of a rechargeable battery within the portable computing device.

In some embodiments, the computing-device control information specifies: a power state for the portable computing device, wherein the portable computing device uses the power state to control power usage of components within the portable computing device.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Fuel Cell System

Figure 1A:
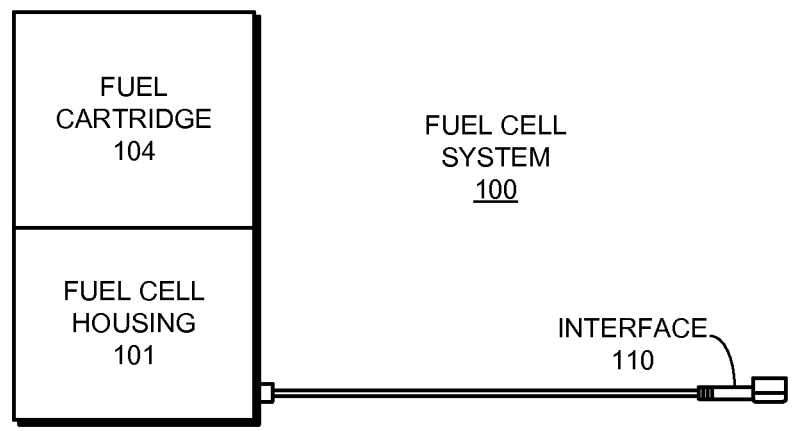
FIG. 1A illustrates a fuel cell system in accordance with the disclosed embodiments.

FIG. 1A provides an external view of a portable fuel cell system 100 in accordance with the disclosed embodiments. This portable fuel cell system 100 includes a fuel cell housing 101, which contains a power module with a fuel cell stack that is described in more detail below with reference to FIG. 1B. Fuel cell housing 101 is configured to receive a detachable fuel cell cartridge 104, which contains a suitable fuel, such as sodium borohydride ($NaBH_4$). Moreover, fuel cell housing 101 can provide power to a portable electronic device through a special interface 110.

Figure 1B:
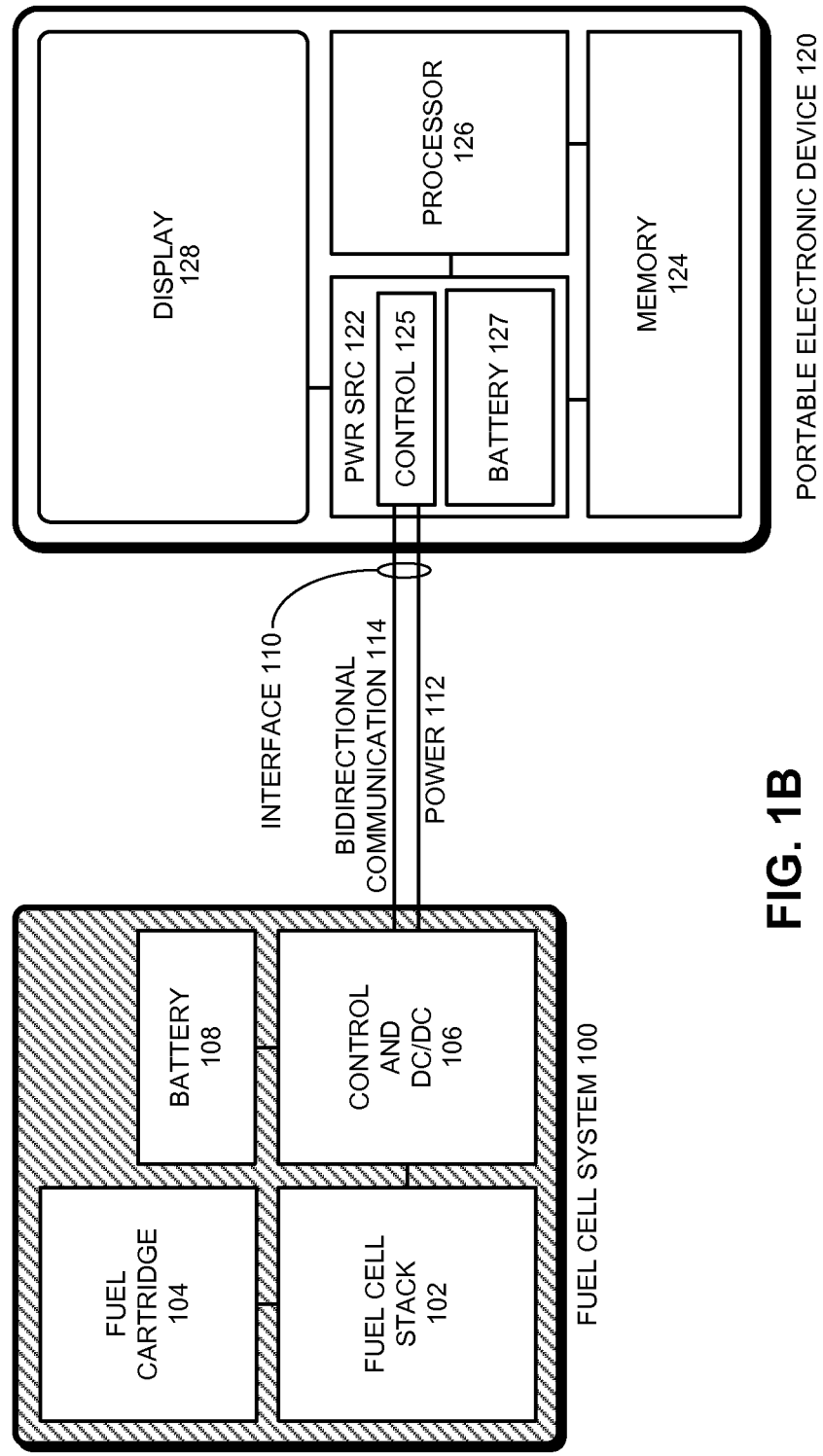
FIG. 1B illustrates how a fuel cell system can be connected to a portable computing device in accordance with the disclosed embodiments.

FIG. 1B illustrates some of the internal structures of fuel cell system 100 in accordance with the disclosed embodiments. More specifically, fuel cell system 100 includes a fuel cell stack 102 which produces electrical power by converting a source fuel, such as hydrogen or a hydrocarbon, into an electric current and a waste product. Fuel cell stack 102 comprises a stack of fuel cells, wherein each a fuel cell contains an anode, a cathode, and an electrolyte between the anode and cathode. Electricity may be generated by two chemical reactions within the fuel cell. First, a catalyst at the anode oxidizes the fuel to produce positively charged ions and negatively charged electrons. The electrolyte may allow ions from the oxidation process to pass through to the cathode while blocking passage of the electrons. The electrons may thus be used to drive a load connected to the fuel cell before recombining with the ions and a negatively charged atom (e.g., oxygen) at the cathode to form a waste product such as carbon dioxide and/or water.

The fuel cells within fuel cell stack 102 may include electrochemical cells that convert a source fuel into electric current and a waste product. For example, the fuel cells may be proton exchange membrane (PEM) fuel cells that use hydrogen as a fuel. The hydrogen may be catalytically split into protons and electrons at the anode of each PEM fuel cell. The protons may pass through an electrically insulating membrane electrode assembly (MEA) to the cathode of the PEM fuel cell, while the electrons may travel through a load to the cathode. The protons and electrons may then react with oxygen atoms at the cathode to form water molecules as a waste product. Alternatively, the fuel cells may correspond to solid oxide fuel cells, molten carbonate fuel cells, direct methanol fuel cells, alkaline fuel cells, and/or other types of fuel cells.

Because individual fuel cells may generate a voltage (e.g., 0.5-0.7 volts for PEM fuel cells) which is too low to drive some components in a portable electronic device (e.g., processors, peripheral devices, backlights, displays, Universal Serial Bus (USB) ports, etc.), the fuel cells may be electrically connected in a series configuration. For example, a set of 25 PEM fuel cells may be connected in series within fuel cell stack 102 to increase the voltage of fuel cell stack 102 to roughly 12.5-17.5 volts. This increased voltage may then be used to drive components with operating voltages which are at or below the voltage of fuel cell stack 102.

Power from fuel cell stack 102 feeds into circuitry 106 that performs control functions and performs direct-current (DC)-to-DC conversion operations before the power feeds through interface 110 to power portable electronic device 120. The power can also be directed to an internal rechargeable battery 108, which is configured to store excess power generated by fuel cell stack 102. Note that internal battery 108 can also be used to power a portable electronic device during a transient period when fuel cell stack 102 is preparing to produce power. Also note that instead of using rechargeable battery 108, other energy storage methods can be used, such as Super Capacitors or Lithium-Ion Capacitors. In all of these methods, the system simply stores the power in a convenient location to facilitate meeting the subsequent instantaneous power requirements of portable electronic device 120.

FIG. 1B also illustrates how fuel cell system 100 can be connected to a portable electronic device 120 through a special interface 110. This special interface 110 includes: (1) a power link that provides power 112 to the portable computing device, and (2) a bidirectional communication link that provides bidirectional communication 114 between the portable computing device and the controller for the fuel cell system. This bidirectional communication link enables the portable electronic device to control various aspects of the operation of portable fuel cell system 100 as will be described in more detail below.

Note that interface 110 may provide physical links for both power and communication. However, in an alternative embodiment, interface 110 may provide a single physical connection for the power link and a wireless bi-directional data link. In other embodiments, the power link may also be wireless.

Portable electronic device 120 may correspond to a laptop computer, mobile phone, personal digital assistant (PDA), portable media player, digital camera, and/or other type of compact electronic device. For example, portable electronic device 120 may include a processor 126, a memory 124 and a display 128, which are all powered by a power source 122. Power source 122 includes a controller 125 which selectively provides power from an internal rechargeable battery 127, or from an external source, such as fuel cell system 100.

In an alternative configuration, portable fuel cell system 100 can be "daisy-chained" so that it is connected to another fuel cell system which may or may not be connected in turn to another computer system or computing device. Moreover, portable fuel cell system 100 can also operate as a stand-alone device, wherein it operates to charge up internal battery 108.

Internal Structure of a Fuel Cell System

Figure 2A:
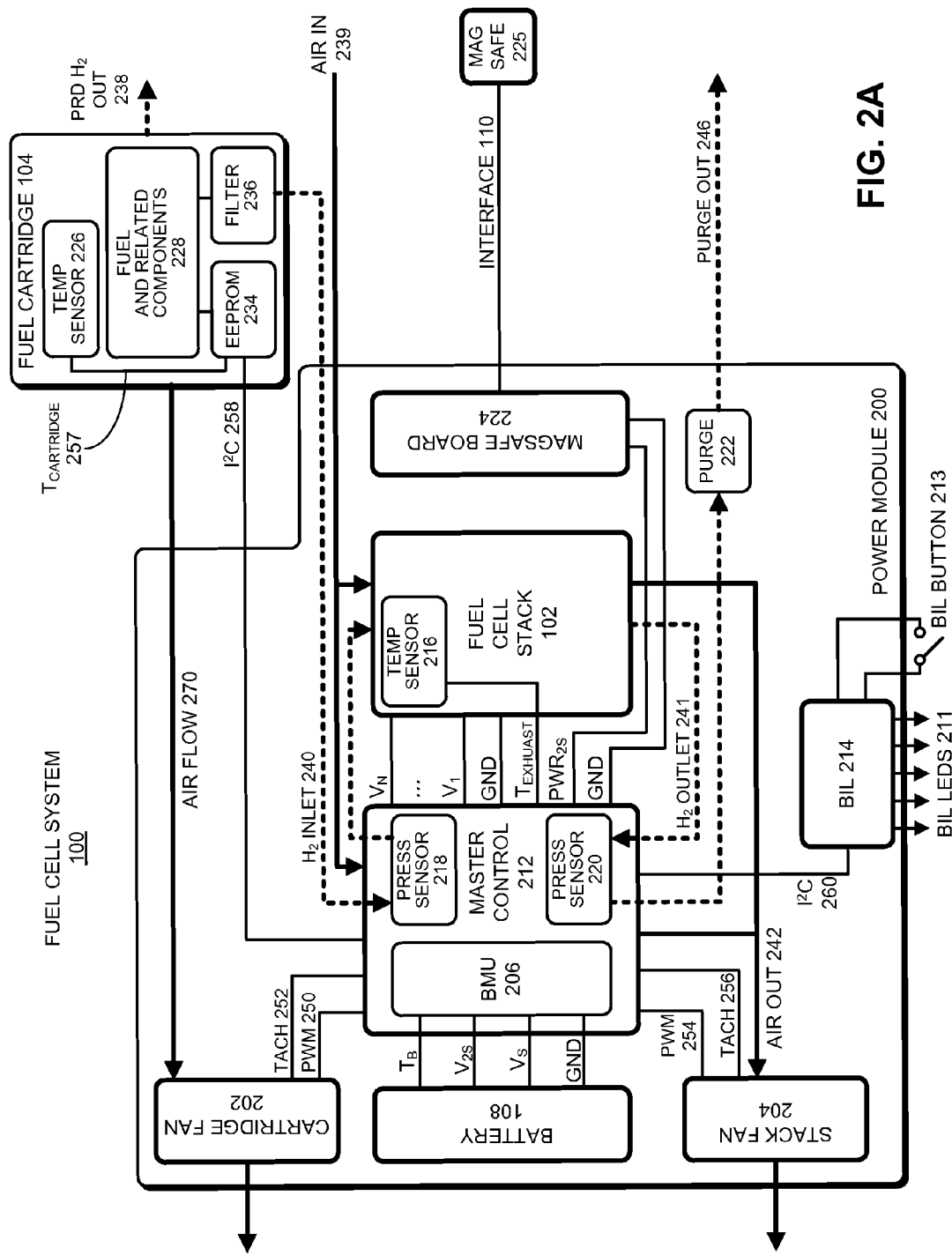
FIG. 2A illustrates details of the internal structure of a fuel cell system in accordance with the disclosed embodiments.

FIG. 2A illustrates details of some of the internal structure of a fuel cell system 100 in accordance with the disclosed embodiments. The illustrated fuel cell system 100 includes a fuel cartridge 104 that plugs into a power module 200. Power module 200 provides power to a portable computing device through a MagSafe™ connector which is coupled to the end of an interface cable 110. (Recall that interface cable 110 includes a power link as well as a bidirectional communication link.) Note that the connector on interface cable 110 is not limited to a MagSafe™ connector, and in general can include any type of connector that provides power and bi-directional communication, such as a USB connector or a 30-pin iPod™ connector. Also note that power module 200 is located within a fuel cell housing, such as fuel cell housing 101 illustrated in FIG. 1A.

Fuel cartridge 104 is comprised of a number of components, which depend on the nature of the fuel. For example, if the hydrogen is produced by a hydrolysis reaction, the fuel cartridge contains components that may include (in addition to a hydrogen-containing substance) another substance (or substances) that chemically react with the hydrogen-containing substance to release hydrogen. To support a hydrolysis reaction, the fuel cartridge can also include: (1) a feed or pump mechanism to enable the substances to combine to produce hydrogen; (2) a metering mechanism to allow for the correct ratio of substances for optimal hydrogen production; (3) a heat-dissipation mechanism (such as a fan) if the hydrogen-producing reaction is highly exothermic; (4) any filters needed to maintain the requisite purity and/or physical consistency of the reactants; and (5) a mechanism for containing any waste product that may result from the hydrogen-producing reaction. Exemplary fuels that can be used with a hydrolysis reaction can include: Sodium Borohydride, Sodium Silicate, Lithium Hydride, Magnesium Hydride, Lithium Borohydride and Lithium Aluminum Hydride.

Moreover, if hydrogen is produced by a thermolysis technique, the fuel cartridge may include (in addition to the hydrogen-containing substance) a heater that heats the hydrogen-containing substance to a sufficiently high temperature to liberate hydrogen. It may also contain a structure for thermally insulating the heater, and a structure for containing any waste product that may result. Exemplary fuels that can be used with a thermolysis technique can include: Aluminum Hydride, Amine Borane Complexes (e.g., Ammonia Borane), Hydrocarbons (e.g., Methanol), Lithium Aluminum Hydride, Magnesium Borohydride, and a Magnesium Borohydride-Amine complex.

The fuel may also take the form of pure hydrogen (e.g., compressed hydrogen gas or liquid hydrogen) in which case the fuel cartridge may contain components such as a metering device (e.g., a valve) and a pressure gauge. Ideally, the fuel has a relatively low life cycle carbon footprint, is not toxic, and generates a waste product that is amenable to being repeatedly re-charged with hydrogen and is not toxic.

More specifically, fuel cartridge 104 is comprised of a number of components, including fuel and related components 228. During operation, the fuel and related components 228 create hydrogen gas which passes through a filter 236 before feeding into an $H_2$ inlet 240 in power module 200. Operations within fuel cartridge 104 are generally controlled by an EEPROM 234, which communicates with master control board 212 in power module 200 through an $I^2C$ bus 258. A temperature sensor 226 within fuel cartridge 104 determines a temperature of the fuel cartridge 104 and communicates a temperature value $T_{CARTRIDGE}$ 257 to EEPROM 234. In addition, a cartridge fan 202 within power module 200 pulls a cooling air flow 270 through fuel cartridge 104. Fuel cartridge 104 also includes a pressure relief device (PRD), such as a valve, which vents hydrogen gas (PRD $H_2$ out 238) if too much hydrogen builds up within fuel cartridge 104.

The flow of hydrogen through fuel cell system 100 is illustrated by the dashed lines. Hydrogen gas which is generated by fuel cartridge 104 passes through a pressure sensor 218 in master control board 212 before feeding into fuel cell stack 102. Fuel cell stack 102 also includes a temperature sensor 216, which provides an exhaust temperature $T_{EXHAUST}$ to master control board 212. Excess hydrogen (along with nitrogen and water) exits fuel cell stack through $H_2$ outlet 241 and feeds through a pressure sensor 220 in master control board 212 before feeding into a passive purge valve 222. Passive purge valve 222 vents the excess hydrogen, nitrogen and water through purge output 246.

Fuel cell stack 102 generates power from the hydrogen gas. More specifically, voltage outputs $V_1, \ldots, V_N$ from individual cells within fuel cell stack 102 feed into master control board 212, which directs power from these voltage outputs into either: internal battery 108 through $V_{2S}$, $V_S$ and GND connections; or into MagSafe™ board 224 though $PWR_{2S}$ and GND connections. Internal battery 108 can store the power received from fuel cell stack 102, whereas MagSafe™ board 224 can direct the power to a portable computing device through interface 110 and MagSafe™ connector 225. Master control board 212 controls internal battery 108 through a battery management unit (BMU) 206, which monitors a temperature $T_B$ from internal battery 108.

Master control board 212 also independently controls two or more fans, including cartridge fan 202 and stack fan 204. More specifically, master control board 212 controls cartridge fan 202 by providing power and a pulse-width modulated (PWM) signal 250 to cartridge fan 202. During this process, control board 212 receives a tachometer signal TACH 252 from cartridge fan 202 which indicates a speed of cartridge fan 202. As mentioned above, during operation cartridge fan 202 pulls cooling air through fuel cartridge 104. Similarly, master control board 212 controls stack fan 204 by providing power and a pulse-width modulated (PWM) signal 254 to stack fan 204. Control board 212 also receives a tachometer signal TACH 256 from stack fan 204 which indicates a speed of stack fan 204. During operation, stack fan 204 pulls cooling air across master control board 212 and through fuel cell stack 102.

Master control board 212 is also coupled to a battery indicator light (BIL) board 214 through an I$^2$C link 260. To determine a state-of-charge of internal battery 108, a user presses an associated BIL button 213. In response to this button press, BIL board 214 communicates with BMU 206 within master control board 212 to determine a state-of-charge of internal battery 108, and then outputs a pattern on BIL LEDs 211, wherein the pattern indicates the determined state-of-charge.

DC/DC Conversion Process

Figure 2B:
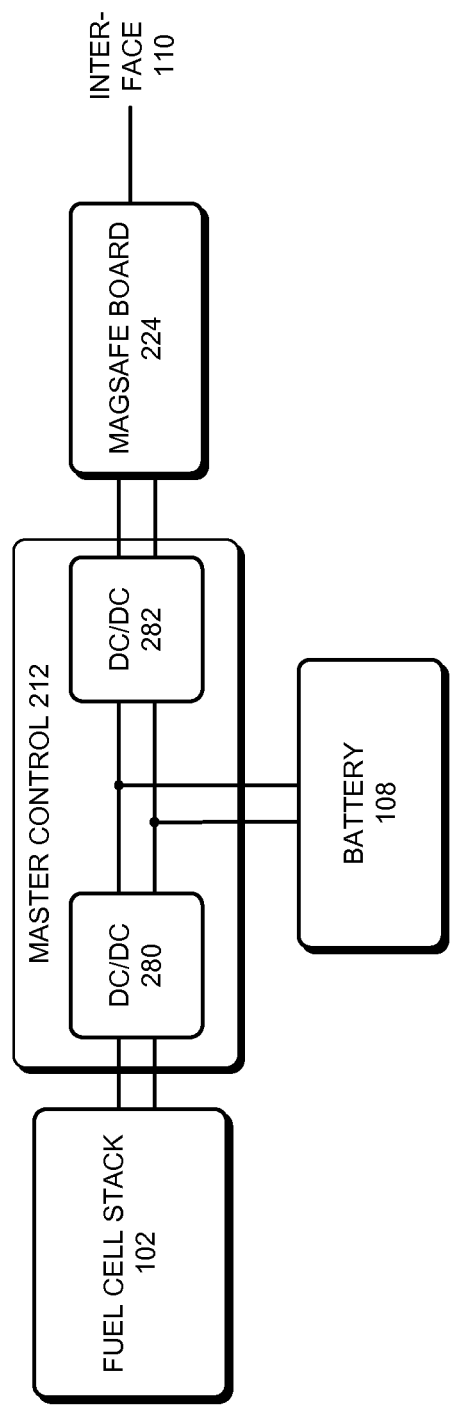
FIG. 2B illustrates a fuel cell system which uses two DC/DC converters in accordance with the disclosed embodiments.

FIG. 2B illustrates how the fuel cell system can use two DC/DC converters in accordance with the disclosed embodiments. During operation, master control board 212 receives power from fuel cell stack 102 and converts the power using a first DC/DC converter 280 into a battery voltage which is suitable for charging internal battery 108. Next, a second DC/DC converter 282 converts the battery voltage into a voltage suitable for powering a portable electronic device, and this voltage is fed into MagSafe™ board 224, which feeds the power to the portable computing device through interface 110.

System Operation

Normal operation of the system begins when the fuel cell system 100 is attached to a host, such as portable electronic device 120. If the state-of-charge of the internal battery in fuel cell system 100 is in a nominal state (between high and low state-of-charge thresholds), power delivery to the host begins. The control system then enters an initialization state and begins requesting fuel from the cartridge.

The cartridge responds by beginning its fuel generation process. During this process, hydrogen may be provided directly from a source of pure hydrogen (such as from a vessel containing compressed hydrogen gas), or it may be generated via thermolysis, hydrolysis, electrolysis, reformation, etc. As hydrogen is generated and transported to the power module, the cells in the fuel cell stack experience a voltage rise to their open circuit voltage (OCV). After the voltages cross a threshold, the controller begins to draw small amounts of current.

When this current does not excessively result in depression of the cell voltages from OCV, the system transitions into a "run" state. In the run state, hydrogen enters the fuel cell and is converted to current and heat. The oxygen for the reaction is supplied by the stack fan from ambient air, and heat is exchanged by controlling the fan to maintain the stack at a constant temperature.

Current from the stack is converted to the voltage of the internal battery and stored. The pressure control loop maintains stack outlet pressure at a set point by controlling the DC/DC input current and charging/discharging the internal battery as necessary. The output of the internal battery charger goes through another DC/DC conversion and then powers the host computer.

In the case of a fuel cartridge where hydrogen is produced by an exothermic reaction, the controller maintains the cartridge temperature at its set point using a cartridge fan.

During normal stack operation, nitrogen and water must be periodically purged from the anode side. The system transitions to the purge state when the mean cell voltage drops below a threshold. During a "purge" state, the load on the stack is removed, resulting in an anode pressure rise. When the anode pressure exceeds the burst pressure of the passive purge valve, the purge valve opens. At the termination of the purge, the stack is loaded, and the pressure of the stack is returned to the nominal operating pressure. The passive purge valve closes when the pressure decreases below the closing pressure of the valve.

Many of the above-described operations of fuel cell system 100 can be controlled through communications between fuel cell system 100 and portable electronic device 120 as is described in more detail below with reference to the flow chart in FIG. 3.

Controlling a Fuel Cell System from a Portable Electronic Device

Figure 3:
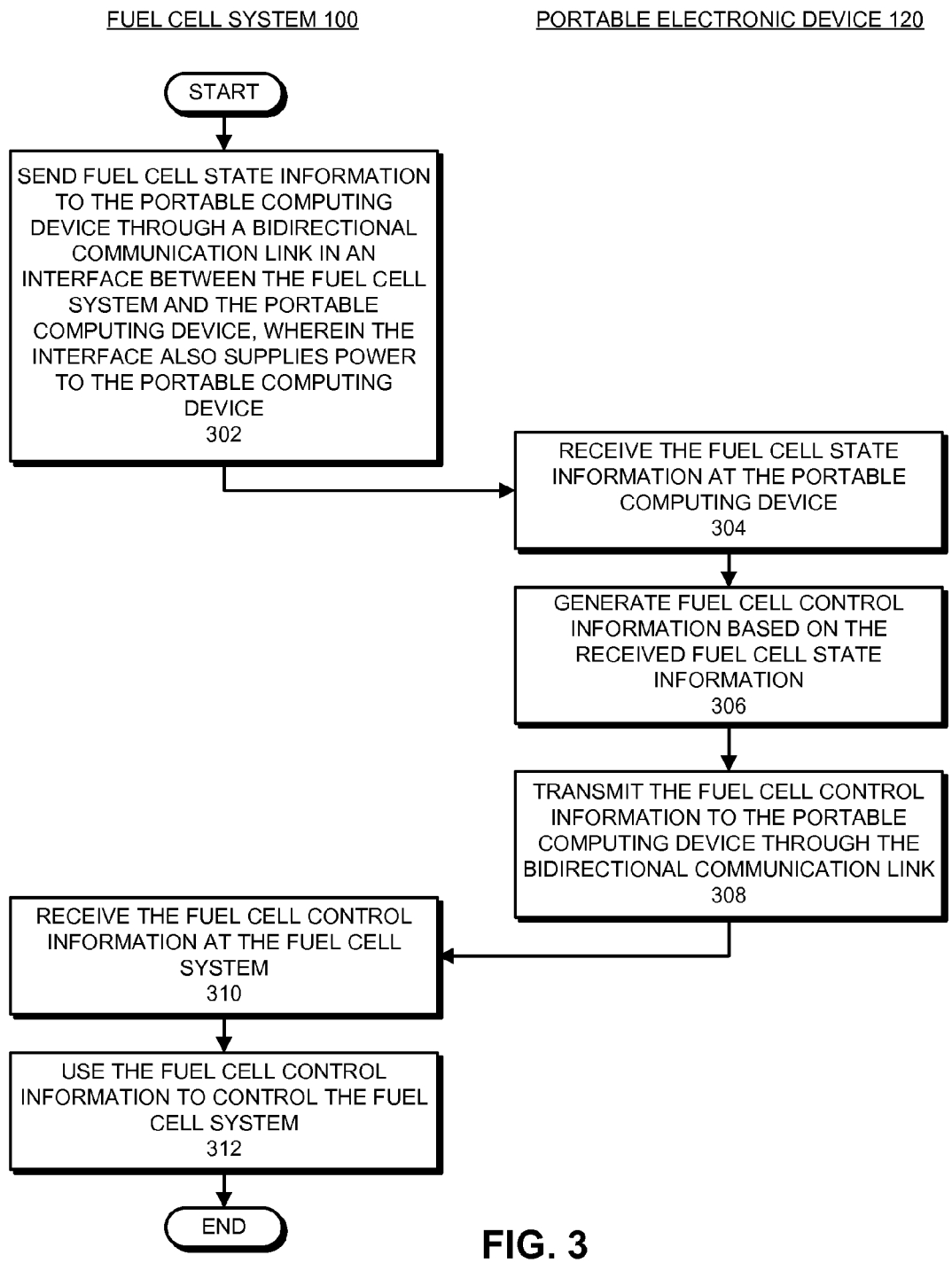
FIG. 3 presents a flow chart illustrating how a portable computing device can control a fuel cell system in accordance with the disclosed embodiments.

FIG. 3 presents a flow chart illustrating how a portable computing device can control a fuel cell system in accordance with the disclosed embodiments. The left-hand column of FIG. 3 lists actions performed by fuel cell system 100 and the right-hand column lists actions performed by portable electronic device 120. During operation, fuel cell system 100 sends fuel cell state information to portable electronic device 120, wherein the fuel cell state information is sent through an interface that comprises: a power link that provides power to the portable computing device; and a bidirectional communication link that provides bidirectional communication between the portable computing device and the fuel cell system (step 302). For example, the fuel cell state information can specify one or more of the following: how much power is available from the fuel cell system; a state-of-charge of an internal rechargeable battery within the fuel cell system; a temperature of the fuel cell stack; a pressure at an inlet of the fuel cell stack; a pressure at an outlet of the fuel cell stack; cell voltages for individual cells in the fuel cell stack; how much fuel remains in the fuel source; certification information for the fuel cell system; and identification information that facilitates identifying an individual fuel cell unit and/or individual fuel cartridges.

Next, portable electronic device 120 receives the fuel cell state information (step 304), and in response generates fuel cell control information based on the received fuel cell state information (step 306). For example, the fuel cell control information can specify one or more of the following: a request for a specified amount of power from the fuel cell system; a reactant rate in the fuel source; a fuel cell stack current to be pulled off the fuel cell stack; a speed of a fan within the fuel stack system; and a command to run diagnostics for the fuel cell system.

The fuel cell control information can also specify power demand predictions. For example, the fuel cell control information can specify that portable computing device 120 expects to require 60 W of power in ten minutes time. In another example, as the battery within the portable electronic device 120 charges up, the fuel cell control information can specify that the demand for power from the fuel cell system 100 is likely to decrease over time. Providing such power demand predictions enables fuel cell system 100 to optimize its performance differently than if such predictions were not available.

Portable electronic device 120 then transmits the fuel cell control information to fuel cell system 100 through the bidirectional communication link (step 308). Finally, fuel cell system 100 receives the fuel cell control information (step 310), and uses the received fuel cell control information to control the fuel cell system (step 312). The above-described processes for controlling the fuel cell system can involve using one or more feedback-control loops to actively control one or more operating parameters of the fuel cell system.

The foregoing descriptions of embodiments have been presented for purposes of illustration and description only.

They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A fuel cell system for a portable computing device, comprising:
　a fuel cell stack which converts fuel to electrical power;
　a fuel source for the fuel cell stack;
　a controller for the fuel cell system; and
　an interface to the portable computing device, wherein the interface comprises:
　　a power link that provides power to the portable computing device; and
　　a communication link that provides communication from the portable computing device to the controller for the fuel cell system;
　wherein the controller for the fuel cell system is configured to:
　　receive fuel cell control information from the portable computing device through the communication link; and
　　use the received fuel cell control information to control the fuel cell system.

2. The fuel cell system of claim 1, wherein the fuel source is a fuel cartridge detachably affixed to the fuel cell system.

3. The fuel cell system of claim 1, further comprising a fan within the fuel cell system configured to produce an air flow that:
　supplies oxygen to the fuel cell system; and
　provides cooling for the fuel cell system.

4. The fuel cell system of claim 1, further comprising an internal rechargeable battery within the fuel cell system configured to level a load for the fuel cell system.

5. The fuel cell system of claim 4, further comprising a first direct-current DC-to-DC converter, which converts a voltage from the fuel cell stack into a battery voltage for the internal rechargeable battery.

6. The fuel cell system of claim 5, further comprising a second DC-to-DC converter, which converts the battery voltage to a computing-device voltage which is used to power the computing device.

7. The fuel cell system of claim 1 wherein the controller for the fuel cell system is further configured to send fuel cell state information from the fuel cell system to the portable computing device through the communication link.

8. The fuel cell system of claim 1, wherein the fuel cell control information specifies one or more of the following:
　a request for a specified amount of power from the fuel cell system;
　a fuel cell stack current to be pulled off the fuel cell stack.

9. The fuel cell system of claim 1, wherein the fuel cell state information and the fuel cell control information are used in one or more feedback-control loops to actively control one or more operating parameters of the fuel cell system.

10. The fuel cell system of claim 1, wherein the bidirectional communication link also communicates:
　computing-device state information from the portable computing device to the fuel cell system; and
　computing-device control information from the fuel cell system to the portable computing device.

11. The fuel cell system of claim 10, wherein the computing-device state information specifies one or more of the following:
　a power requirement for the portable computing device; and
　a state-of-charge of a rechargeable battery within the portable computing device.

12. The fuel cell system of claim 10, wherein the computing-device control information specifies:
　a power state for the portable computing device, wherein the portable computing device uses the power state to control power usage of components within the portable computing device.

13. The fuel cell system of claim 1, wherein the power link comprises a wireless link.

14. The fuel cell system of claim 1, wherein the communication link comprises a wireless link.

15. The fuel cell system of claim 7, wherein the fuel cell state information specifies one or more of the following:
　how much power is available from the fuel cell system;
　a state-of-charge of an internal rechargeable battery within the fuel cell system.

16. The fuel cell system of claim 7 wherein the fuel cell state information specifies one or more of a temperature of the fuel cell stack, a pressure at an inlet of the fuel cell stack, and a pressure at an outlet of the fuel cell stack.

17. The fuel cell system of claim 7 wherein the fuel cell state information specifies a cell voltage for one or more cells in the fuel cell stack.

18. The fuel cell system of claim 7 wherein the fuel cell state information specifies an amount of fuel remaining in the fuel source.

19. The fuel cell system of claim 8 wherein the fuel cell control information specifies a fan speed within the fuel cell system.

20. The fuel cell system of claim 8 wherein the fuel cell control information includes a command to run diagnostics for the fuel cell system.

* * * * *